United States Patent [19]
Quinn et al.

[11] Patent Number: 5,386,105
[45] Date of Patent: Jan. 31, 1995

[54] DIFFRACTIVE OPTICAL BEAM SHAPING METHODS AND APPARATUS FOR PROVIDING ENHANCED DEPTH OF WORKING RANGE OF BAR CODE SCANNERS

[75] Inventors: Anna M. Quinn, Rochester; Jay M. Eastman, Pittsford, both of N.Y.

[73] Assignee: PSC Inc., Webster, N.Y.

[21] Appl. No.: 73,368

[22] Filed: Jun. 7, 1993

[51] Int. Cl.$^6$ .............................. G06K 7/10
[52] U.S. Cl. ...................... 235/462; 359/558
[58] Field of Search ............. 235/462, 463; 359/738, 359/888, 894, 559, 558, 562

[56] References Cited

U.S. PATENT DOCUMENTS

| | | | |
|---|---|---|---|
| 3,523,732 | 8/1970 | Mary | 359/738 |
| 4,510,383 | 4/1985 | Ruffender | 235/462 |
| 4,560,862 | 12/1985 | Eastman et al. | 235/462 X |
| 4,603,262 | 7/1986 | Eastman | 250/566 |
| 4,808,804 | 2/1989 | Krichever et al. | 235/462 |
| 4,816,660 | 3/1989 | Swartz et al. | 235/472 |
| 4,820,911 | 4/1989 | Arackellian et al. | 235/462 X |
| 4,831,275 | 5/1989 | Drucker | 235/462 X |
| 4,947,413 | 8/1990 | Jewell et al. | 359/562 X |
| 5,016,981 | 5/1991 | Peppers et al. | 359/888 X |
| 5,080,456 | 1/1992 | Katz et al. | 235/462 X |
| 5,111,343 | 5/1992 | Harrigan | 359/888 |
| 5,121,378 | 6/1992 | Hirose et al. | 369/112 |
| 5,200,597 | 4/1993 | Eastman | 235/455 |
| 5,210,398 | 5/1993 | Metlitsky | 235/462 |

FOREIGN PATENT DOCUMENTS 0411525 2/1991 European Pat. Off. .

OTHER PUBLICATIONS

Advanced Technology in Laser Rased Hand Held Bar Code Scanners by J.7 Eastman Sam Quinn.
Optics & Photonics News, Sep. 1992, vol. 3 No. 9 pp. 25-32.

*Primary Examiner*—Donald Hajec
*Assistant Examiner*—Jeffrey R. Filipek
*Attorney, Agent, or Firm*—M. Lukacher

[57] ABSTRACT

In order to control laser beam propagation, working range and beam cross-section in a bar code scanner, diffractive optics are used to modify the amplitude and/or phase distribution of the beam in the scanner. The beam is diffracted by a mask which has a plurality of apertures in the form of segments which are arranged across the beam cross-section in the vicinity of a converging lens. The segments are sized and their transmission functions selected (one segment having for example 100% transmission and the other 50% transmission) such that bar codes close in and far out from the scanner are in regions of far field diffraction of different segments, or where such regions overlap, thereby extending the working range of the scanner where bar codes of high density can be resolved.

28 Claims, 9 Drawing Sheets

DIFFRACTIVE OPTICAL BEAM SHAPING METHODS AND APPARATUS FOR PROVIDING ENHANCED DEPTH OF WORKING RANGE OF BAR CODE SCANNERS

DESCRIPTION

The present invention relates to diffractive optical beam shaping, especially for use in bar code scanners, so as to enhance the working range over which the bars of a bar code can be resolved thereby including reading of both close in and far out bar codes, and particularly to systems (methods and apparatus) for controlling optical beam propagation, depth of focus and beam cross-section in a manner which is adapted to increase the resolving power of a bar code scanner, that is to minimize the beam size in the scanning direction (across the width of the bars of the code) from which the symbol represented by the code can be recognized in response to light returned to the scanner from the code.

The invention is especially suitable for use in bar code scanners which read code made up of bars which are generally rectangular with laser beams; however the optical beam shaping and amplitude control techniques and apparatus (diffractive optics) provided by the invention may be found generally useful wherever it is necessary or desirable to control the propagation of an optical beam and the shape thereof.

The present invention is an improvement over the methods and apparatus of optical beam shaping by diffractive effects as described in U.S. Pat. No. 5,200,597 issued Apr. 6, 1993 to Eastman et al. The methods and apparatus described in the patent are also generally discussed in an article by Eastman et al. which appeared in Optics and Photonics News, volume 3, No. 9 pages 25–31 on September 1992. The patent describes optics employing far field diffraction to shape a laser beam from a laser diode and maintain its aspect (length to width) ratio constant over a distance in front of the scanner. The '597 patent discloses how the size of an aperture which diffracts the beam may be selected to locate regions of near field and far field diffraction due to the aperture. The '597 patent defines the Fresnel distance. For collimated light, the Fresnel distance may be thought of as the distance along the optical axis from the aperture to the point at which the first Fresnel zone is equal in size to the aperture size, and is given by the square of the aperture radius divided by the wavelength of the light. The '597 patent also points out that the Fresnel distance increases with aperture size. A plot is also provided which relates the size of the beam to the size of the aperture and shows that the beam size decreases in the near field region due to near field or Fresnel diffraction and increases linearly in the far field due to Fraunhoffer diffraction. Further information concerning the diffractive effects obtainable by an aperture in the path of a laser beam may be had by reference to the Eastman et al. patent. The Eastman et al. patent represents an advance in the art of beam shaping and control especially for bar code scanners over prior devices which use physical apertures to shape a beam by cropping. See Eastman et al. U.S. Pat. No. 4,603,262 issued Jul. 29, 1986 and U.S. Pat. No. 4,816,660 issued Mar. 28, 1989.

It is the object of the present invention to provide improved methods and apparatus for beam shaping and control of beam propagation by diffractive effects thereby enhancing the depth of focus or working range of equipment utilizing optical beams, such as bar code scanners.

It is a further object of the invention to provide improved diffractive beam shaping and propagation control methods and apparatus whereby the size of a beam in a predetermined direction across its cross-section may be held within specified tolerances over an enhanced working range, thereby increasing the range over which beam size and resolving power may be maintained in a scanning apparatus, for example such as bar code scanners and readers as well as in other applications where the resolving power of an optical beam is of interest.

It is a still further object of the present invention to provide methods and apparatus for improving the shape of the profile (the variation in intensity) over the cross-section, and particularly along the minimum cross-sectional distance, of an optical (laser) beam and to provide a smooth or a defined (e.g. symmetric or sinc (sin x/x form)) beam intensity profile, with side lobes of adequately low intensity over a distance along which the beam propagates.

It is a still further object of the present invention to provide improved methods and apparatus for extending the depth of focus or working range of a bar code scanner, and particularly to enable the scanner to resolve and read bar codes close to the scanner window through which the scanning beam projects and also to minimize the spot size (in terms of the diameter or resolving dimension of the cross-section of the beam) over an extended depth of focus or working range; i.e. extending the region where a bar code can be resolved, from a location close to the scanner window, while also retaining or increasing the far end of the range away from the window where the code can be resolved.

Briefly described, a system (method and apparatus) for control of beam propagation and shape, which is especially adapted for use in a bar code scanning device, is operative to shape a laser beam which scans the bars of the code to a cross-section with a resolving dimension in the scanning direction across the bars of the code which is sufficiently small to read the code over a certain working range relative to a window of the scanner from which the beam projects. A diffracting element is used in the path of the beam, preferably in the vicinity of a lens which converges the beam to a geometric focus at a distance at least equal to the Fresnel distance of the element which is the beginning of the far field diffraction region prescribed by the element when illuminated by collimated light ($A^2/4\lambda$, where A is the aperture diameter and $\lambda$ is the wavelength of the light). The element is in the form of a mask having a plurality of apertures through which the beam passes. The apertures are preferably provided by a plurality of concentric or symmetrically arranged segments, the symmetry being with respect to the axis of the beam propagating through the mask. The segments are sized in a direction along the resolving dimension to be in predetermined relationship to each other. The relationship is defined by the regions of near and far field diffraction, which due to one segment being of smaller size, overlaps the near field region of diffraction of the segment of larger size. The segments preferably have different transmissivity. It is believed that the transmissivity as well as the size combines so as to smooth the profile of the cross-section of the beam over the working range. The smaller and larger aperture sizes are selected so that their near and far field diffraction regions overlap at a point defined by a beam size which remains generally less than or equal to a desired size over a significant working range (an effective depth of focus).

The foregoing and other objects, features, and advantages of the invention will become more apparent from a reading of the following description in connection with the accompanying drawings in which:

Figure 1:
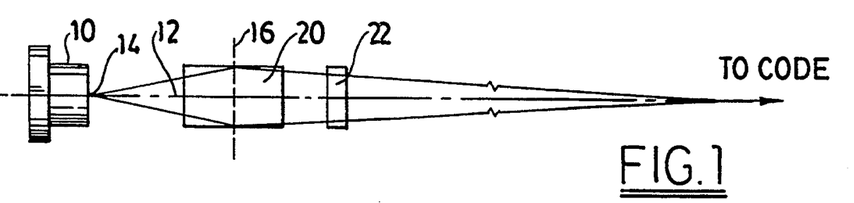
FIG. 1 is an optical ray diagram showing a diffractive beam shaping and control system in accordance with the invention.
Figure 4:
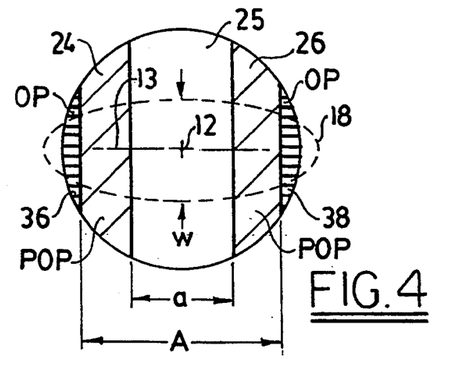
FIGS. 4, 5, 6 and 7 are views in a direction perpendicular to the optical axis along which the laser beam propagates showing masks configured in accordance with different embodiments of the invention.

Referring more particularly to FIG. 1 there is shown a laser diode 10 of the type which produces a beam which diverges mores rapidly (at a greater angle) with respect to a horizontal line perpendicular to the optical axis 12 and indicated at 14 in FIG. 1 than a vertical line (perpendicular to that horizontal line). This creates an elliptical beam which has its major axis horizontal as shown by the dash lines 18 in FIGS. 4–7. The system of the invention may utilize a beam having a circular cross-section rather than an elliptical cross-section as shown, but can work with elliptical beams which have their resolving axes coincident with the minor axis of the ellipse (the dimension w) as shown in FIG. 4.

Figure 2:
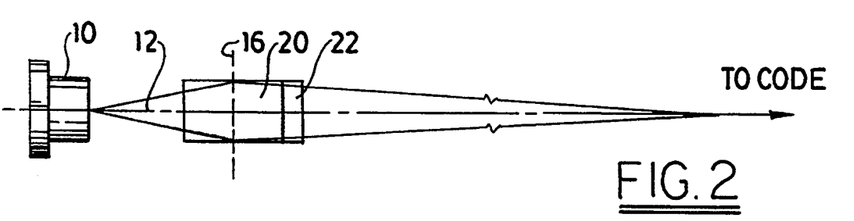
FIG. 2 is a diagram similar to FIG. 1, but with the elements in different relationship.

The beam projects through a lens 20 (an "optical element") which may be a gradient index (grin) lens as described in the above-reference U.S. Pat. No. 5,200,597. This lens is preferably used to provide a slightly converging beam. The lens 20 and a mask 22 provide optic means for controlling the propagation and shaping the beam in accordance with the invention. The mask 22 is in the vicinity of the lens. It is also spaced from the principal plane of the lens where it starts to converge the beam. This principal plane is indicated at 16 in FIG. 1. It has been found to be desirable to use a focused beam with a geometric image distance at a point equal to or farther than the Fresnel distance. Then quasi-near field effects, where the beam starts to diverge at a greater rate than in the far field diffraction region, are avoided. The mask 22 may be placed in abutment with the end, or deposited on the surface, of the lens 12 as shown in FIG. 2. The mask may also be formed by varying the transmissivity of the lens material across the physical aperture of the lens, e.g., by diffusion of optically absorbing ions, or diffusion of dye into a plastic optical element. In any of these cases, it operates to present a plurality of apertures across the beam.

Figure 5:
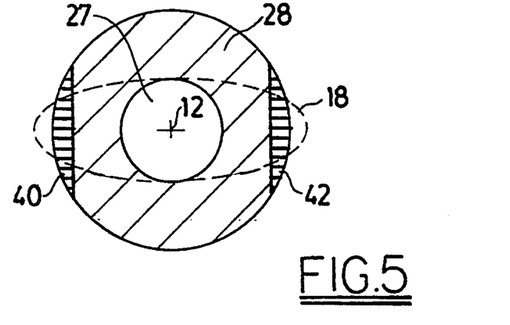
Figure 6:
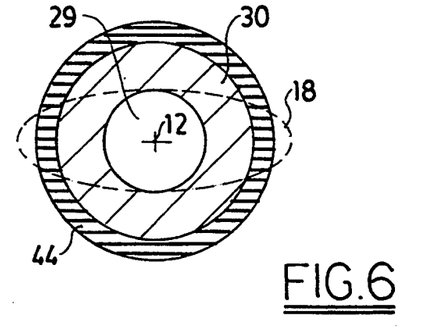
Figure 7:
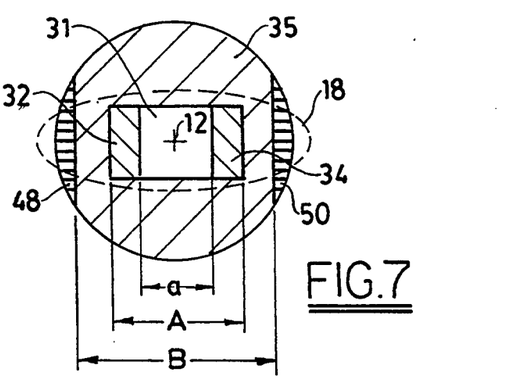

These apertures are preferably segments of a transmission mask of different transmissivity. Bi-segmented transmission masks are shown in FIGS. 4, 5 and 6 and a tri-segmented mask is shown in FIG. 7. The segments are radially symmetric with respect to the optical axis 14 and have inside segments 25, 27, 29 and 31 and outside segments 24, 26, 28, 30 and 32, 34 the inside and outside segments are of different transmissivity. The inside segments may be clear (100% transmission) while the outside segments may be partially opaque, for example 50% transmissivity. Conversely, the outside segments may be of higher transmissivity than the inner segments. The segments are stripes in the case of FIG. 4 with end regions 36 and 38 which are near the ends of the major axis of the beam 18. These end regions 36 and 38 are completely opaque (OP). The mask of FIG. 5, with a circular inside area, may have opaque ends 40 and 42. The circularly symmetric mask of FIG. 6 may have a circular outside opaque area 44. The mask of FIG. 7 has segments which are generally rectilinear in cross-section with opaque ends 48 and 50. These outer most boundaries of the mask may be formed by the physical aperture of the lens or its mount, rather than by the mask itself. The horizontal axis of the masks coincides with the major axis of the beam when the masks are properly aligned with the beam.

The invention enables the resolving power to be maintained by using mask aperture segments of different effective size. The mask aperture segments on the inside have an effective size (a) while the segments provided by the outside apertures have an effective size (A). The inside aperture size for the mask of FIG. 5 is the diameter of the inside circular clear area 27. The outside segment 28, as measured between the opaque areas 40 and 42 is of the dimension (A). The mask of FIG. 6 has an effective segment diameter (a) for the inside circular area 29 and an effective segment diameter (A) for the diameter of the outside segment 30. The mask of FIG. 7 has three successively larger areas. The central area 31 being of size (a), the segments 32 and 34 increasing the size to (A) and the third segment 35 providing a segment area (B).

The beam width determining dimensions or sizes (a, A, B) are along the major axis of the elliptical beam 18. Since the beam flips 90° in the far field diffraction region, as shown and explained in the Eastman et al. U.S. Pat. No. 5,200,597, the beam size determining dimensions of the mask are along the major axis of the beam 18. The masks which are not circularly symmetric must be oriented with respect to the axes of the beam.

Figure 3A:
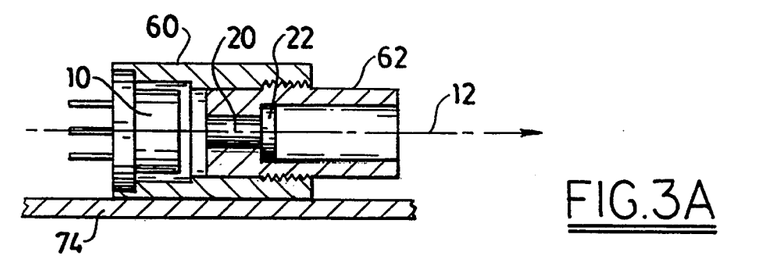
FIG. 3A is a cross-sectional view through optic means for generating, projecting and controlling beam propagation and size in accordance with the invention.

FIG. 3A shows an optical assembly including the optic means which provide beam propagation, control and shaping which is similar to the assembly illustrated in the Eastman et al. Patent (FIG. 8). It includes an outer barrel 60 which captures the laser diode 10 and an inner barrel 62 which is screwed or otherwise fit into the outer barrel with the mask 22 properly aligned with respect to the beam 18 as shown in FIGS. 4-7. In FIG. 3A the mask 22 is in abutting relationship with an end of the lens 20. The transmission mask may also be deposited onto the end of the lens or incorporated in the material of the lens, as described above.

Figure 3B:
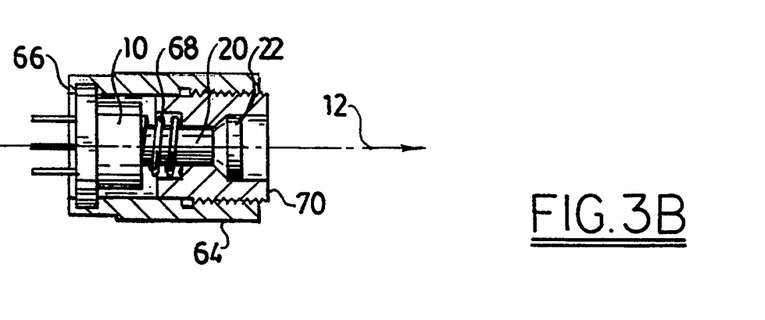
FIG. 3B is a sectional view similar to FIG. 3A showing another embodiment of the beam control shaping and masking optic means of FIG. 3A.

In FIG. 3B the laser diode 10 is also captured in an outer barrel 64. It is biased against a lip 66 of the outer barrel by a spring 68 captured in a cylindrical slot in an inner barrel 70. The mask is spaced along the optical axis from the end of the lens 20. While the lenses 20 in FIGS. 3A and 3B are shown as GRIN lenses, they may be conventional, spherical or aspheric lenses.

Figure 3C:
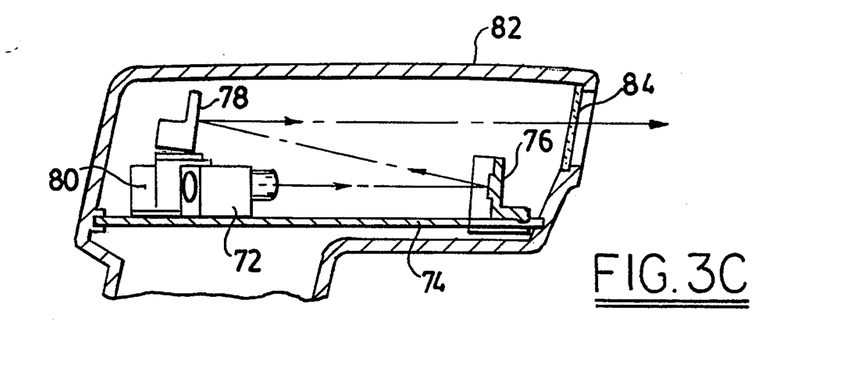
FIG. 3C is a schematic diagram of a hand held bar code scanner incorporating either the optic means of FIGS. 3A or 3B.

FIG. 3C shows a hand held scanner in schematic form where the optic means and laser diode assembly of FIGS. 3A or 3B are shown at 72 on a printed circuit board 74. The beam from the assembly 72 is incident on a mirror 76 and reflected to a scanning, oscillating mirror 78, oscillated by a motor 80. The scanning assembly is contained within a housing 82 having a window 84 through which the beam projects to the code. The light returned from the code is detected and translated into signals from which the code can be recognized. The above-referenced Eastman et al. Patent may be referred to for further details respecting the operation of a scanner such as shown in FIG. 3C.

Figure 8:
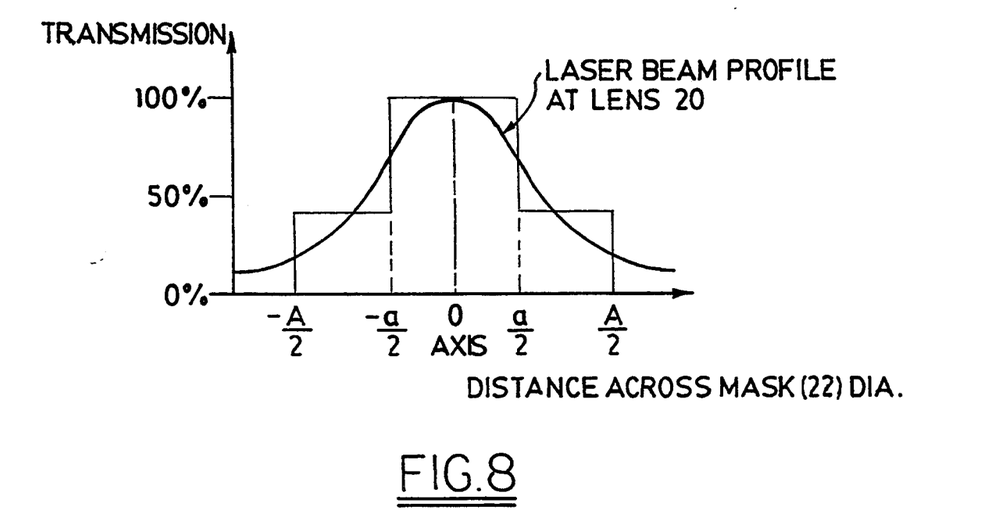
FIG. 8 is a illustration of the transmission function of the mask shown in FIG. 4.

FIG. 8 shows the transmission function of a bi-segmented mask which is illustrated in FIG. 4. The central stripe 25 has a 100% transmission while the outside stripes 24 and 26 provide transmission at approximately 50%. The relationship of the transmissivity of the different segments may be selected in order to tailor the profile of the beam over the working range of the scanner. In some applications, it is advantageous for the inner segments to have lower transmissivity than the outer segments. It is believed that the light diffracted through the different segments interacts. The amount of partial opaqueness (POP) is varied in order to obtain the smoothest profile. Some profiles which are obtained with a POP segment of 50% transmissivity and a clear or 100% transmissive segment are illustrated in FIGS. 12-17 by way of example. These figures illustrate that the resolving power of the beam has been extended to read bar codes close to the window of the scanner as well as far away from the window (for example from a range of approximately one inch to thirty inches from the window). Over this range, the effective width of the beam is sufficiently small to be capable of reading high density code (e.g. 10 mil (0.010 inch) minimum bar widths).

Figure 9:
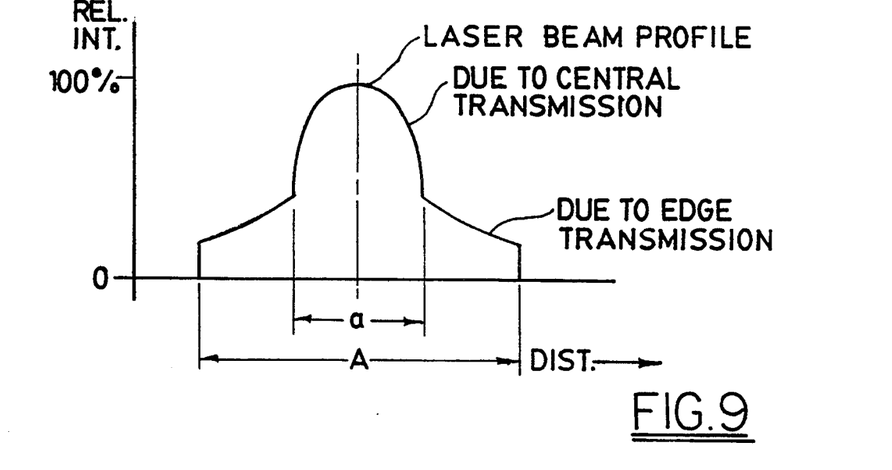
FIG. 9 is a plot showing how the mask effectively bi-segments the beam into two separate beams, which are effectively additively combined.

Effectively, the outside transmission function (called the edge transmission in FIG. 9) reads codes at the far end of the working range, while the central transmission function reads in closer to the window of the scanner. In effect the bi-segmented transmission mask divides the beam into two segments. The center of the mask cores or cuts out a center region of the beam with the characteristic dimension (a). The edge region of the mask cuts out a second region with a characteristic dimension (A). Consequently, the beam may be thought of as being decomposed into two separate beams that propagate independently. These beams combine in accordance with the principle of superposition.

Figure 10:
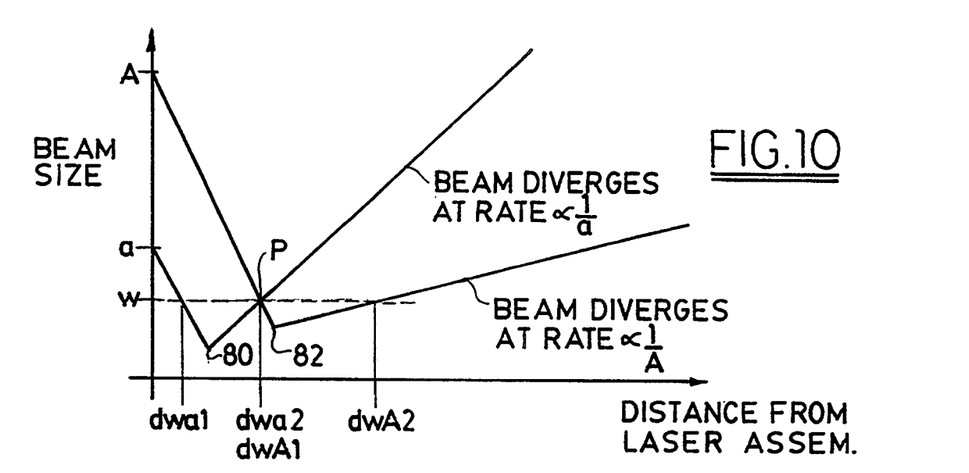
FIG. 10 is a diagram showing the beam size across the resolving axis due to segments of certain size (a, A) across the resolving direction or waist (w) of the beam with distance from the principal plane of the lens where the beam convergence due to the lens begins.

FIG. 10 illustrates the beam size (the width or waist dimension) for each of the beam segments along the resolving axis (the distances (dwA) for the narrower mask segment and (dwA) for the larger mask segment). In the near field region up to the breakpoints 80 and 82, which are approximately at half the Fresnel distance, diffraction causes the beams to decrease in size at a rate greater than predicted by geometrical optics when focused by the converging lens 20. Then the far field diffraction regions commence and the beams diverge at a rate proportional to the reciprocal of the mask segment size (a, A).

The mask segment sizes for a two segment mask are selected so that the characteristics (the near and far field diffraction regions) due to the different segment sizes intersect at a point P. There the waist of the beams (w) due to each mask size are equal (dwa2 or the distance in the far field or second region (region 2) due to the smaller mask segment (a) equals the distance dwA1 due to near field diffraction of the larger mask segment (A)). This is denoted on the diagram as P. The point P is the cross over point where the waist size (the size of the beam along the resolving axis - w) is the same for both segments. Then over a distance, indicated in FIG. 10 as from dwa1 to dwA2 the beam size along the resolving axis is less than or equal to w and this condition of beam size exists over a significant range close to the window 84 (see FIG. 3C) and extends to a significant distance, e.g. 30 inches from the window. Thus, both near in and far out codes can be resolved simply by the use of the segmented mask, and at little significant increase in cost over the use of a one dimensional mask or aperture, and at lower cost than with an autofocus mechanism. The mask may be provided either by a physical aperture or hard stop or a combination of a physical aperture and the phantom aperture discussed in the Eastman et al. Patent referenced above. The mask may be coated on the face of the lens.

Figure 11:
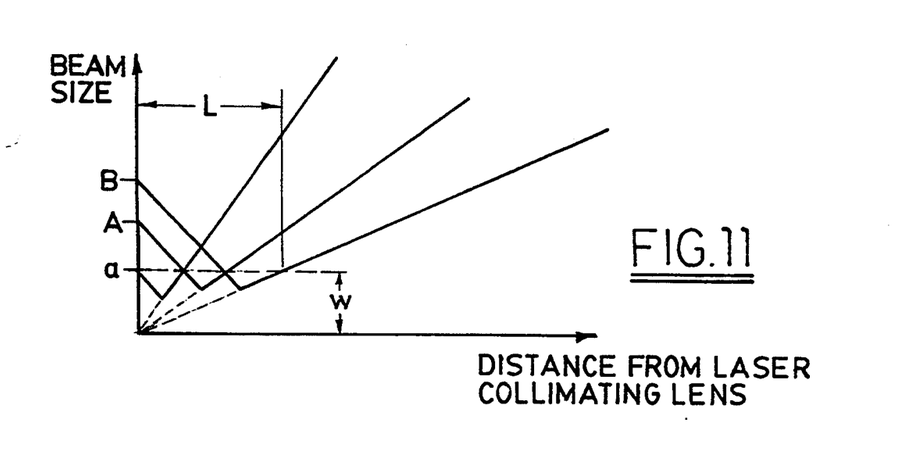
FIG. 11 is a diagram similar to FIG. 10 for a system using a mask similar to that shown in FIG. 7 with three different aperture sizes along the resolving dimension.
Figure 12:
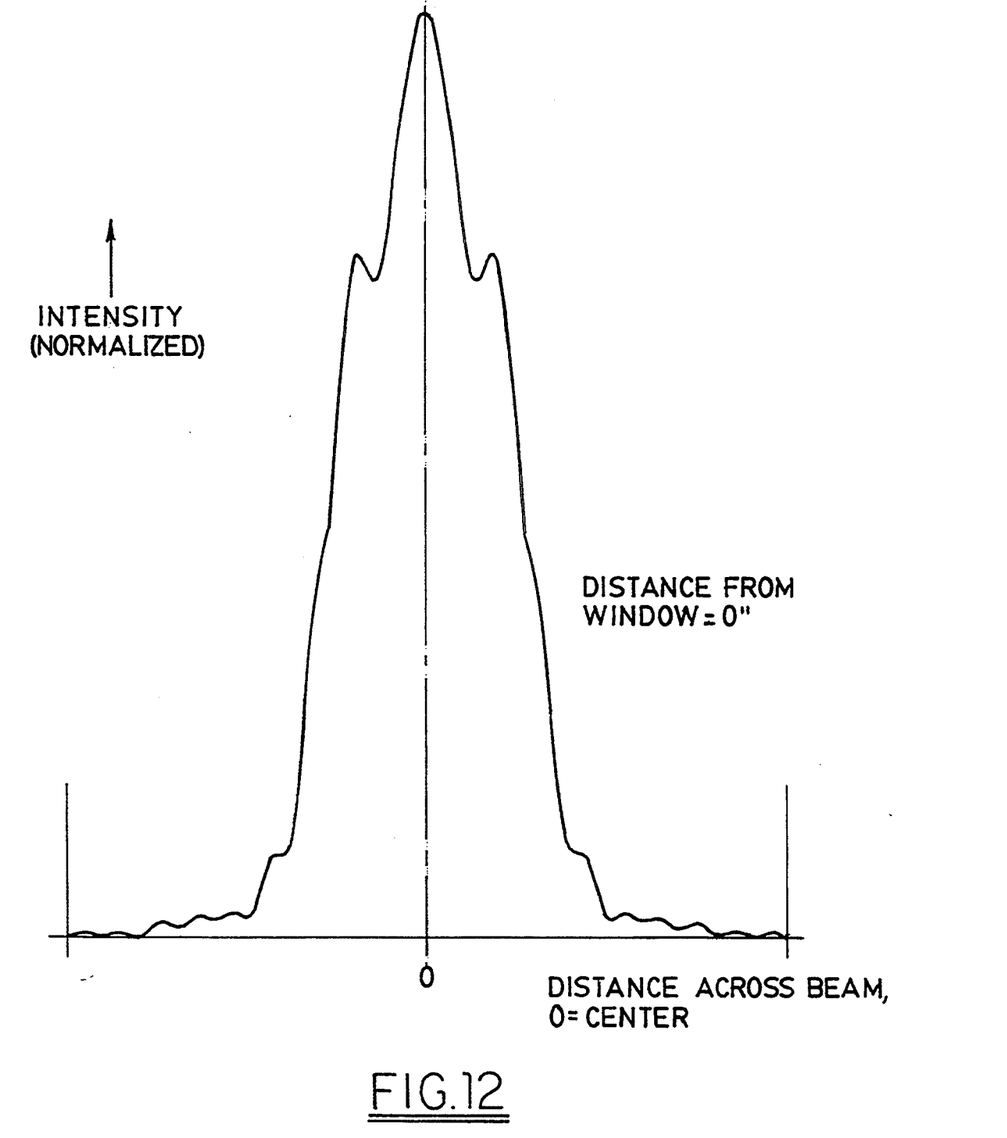
FIGS. 12–17 are views showing the intensity profile of a beam shaped by diffractive effects due to a mask such as shown in FIG. 4 at different distances from the principal plane of the lens of the shaping system.
Figure 13:
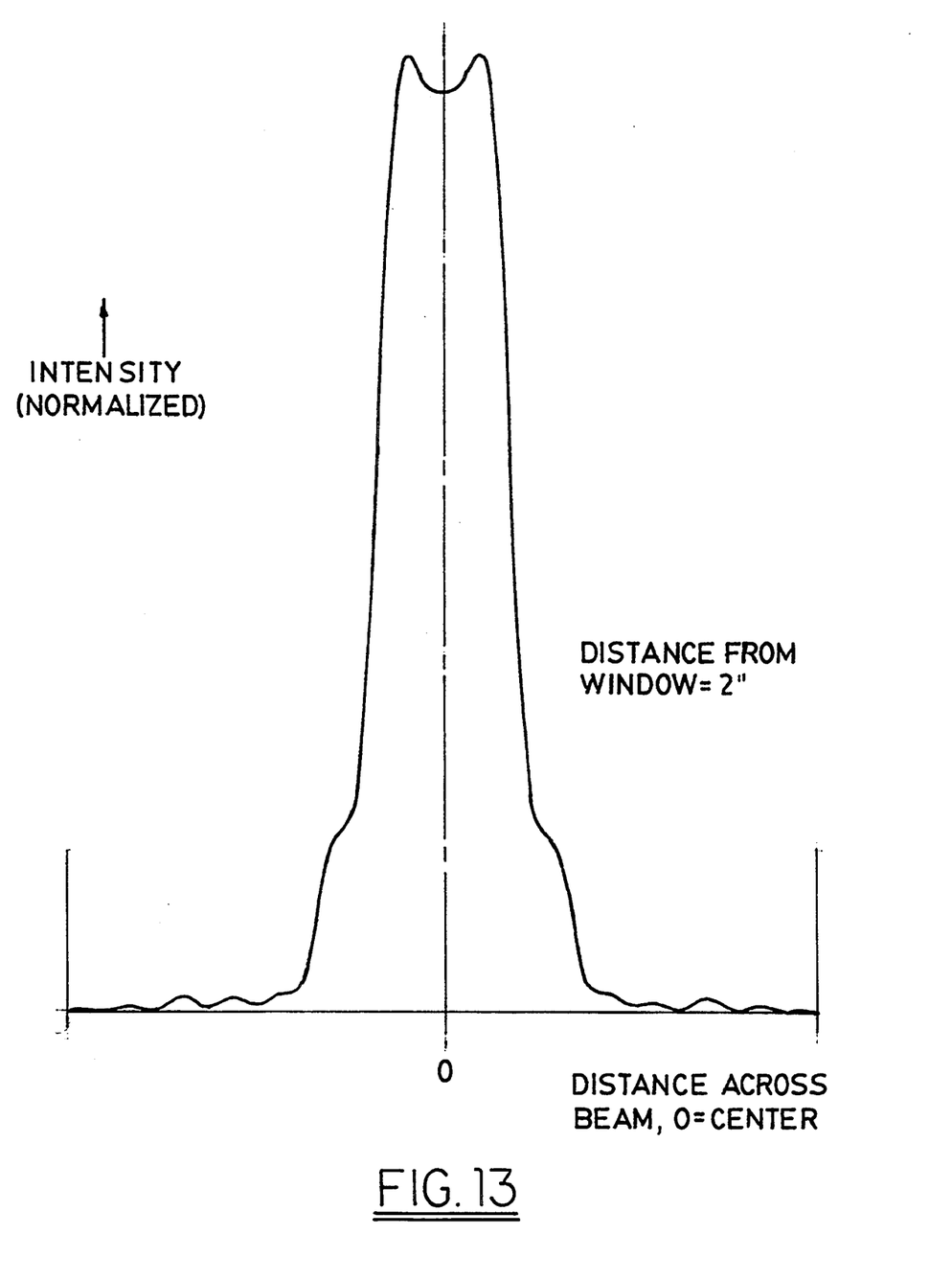
Figure 14:
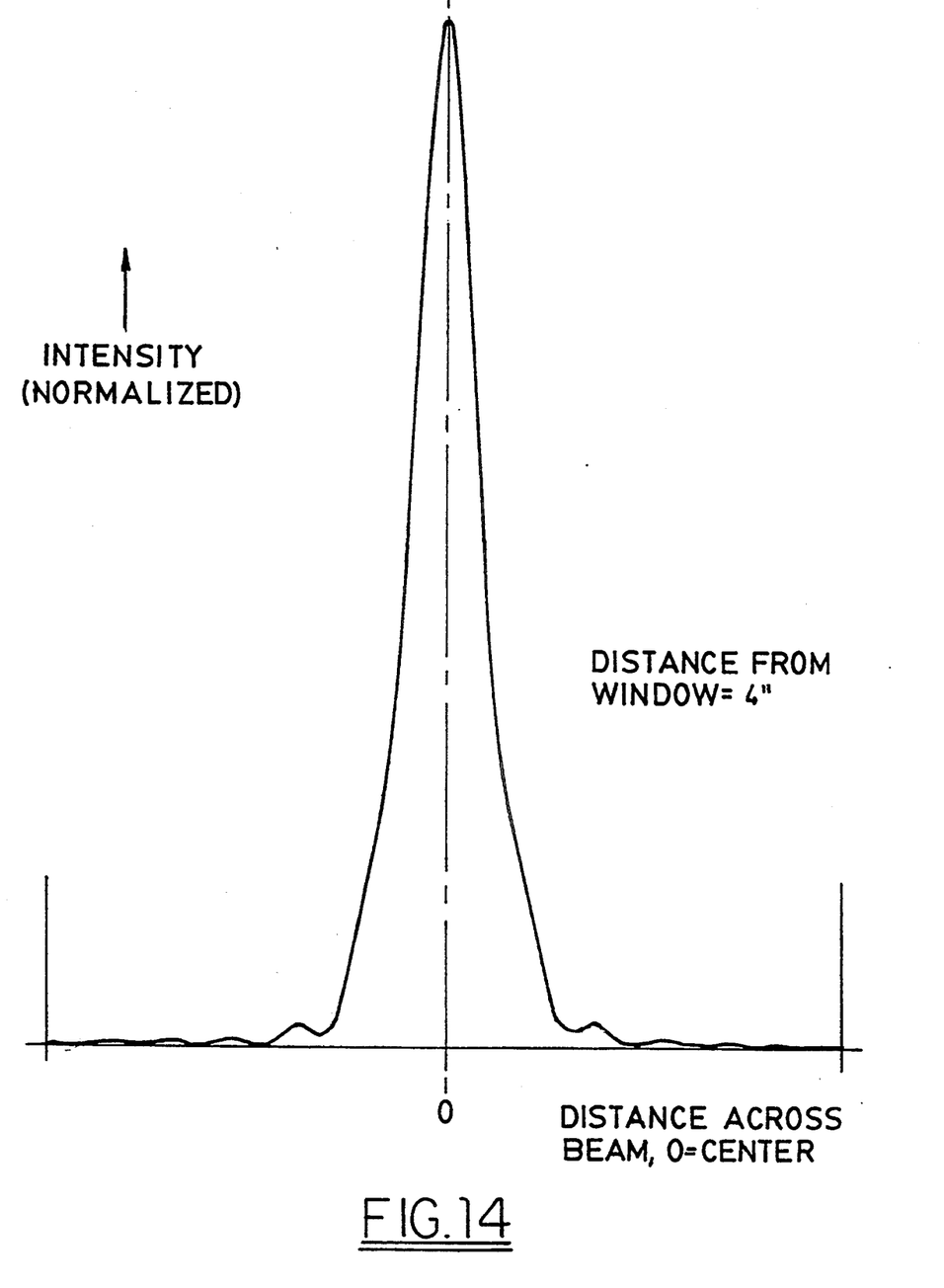
Figure 15:
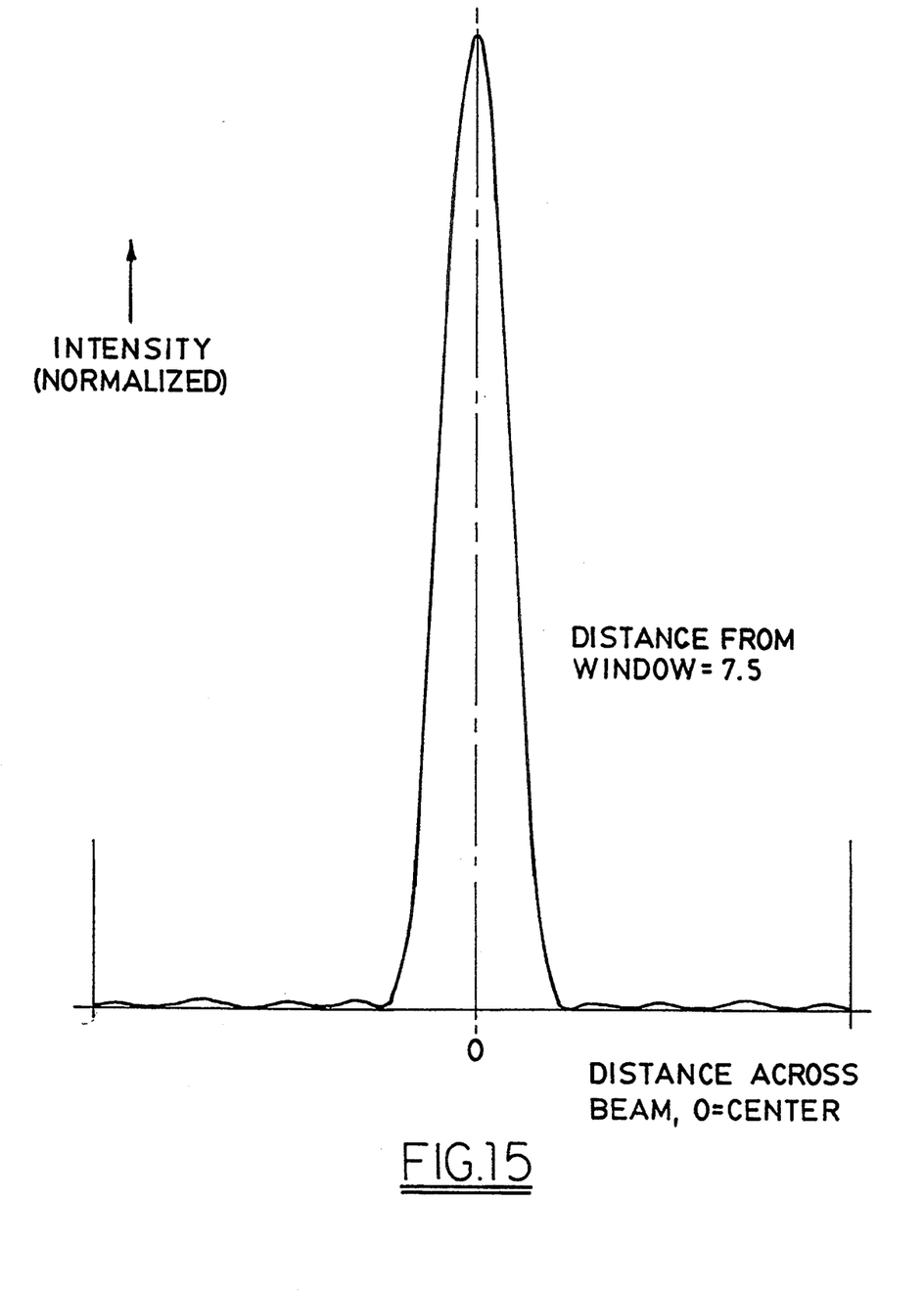
Figure 16:
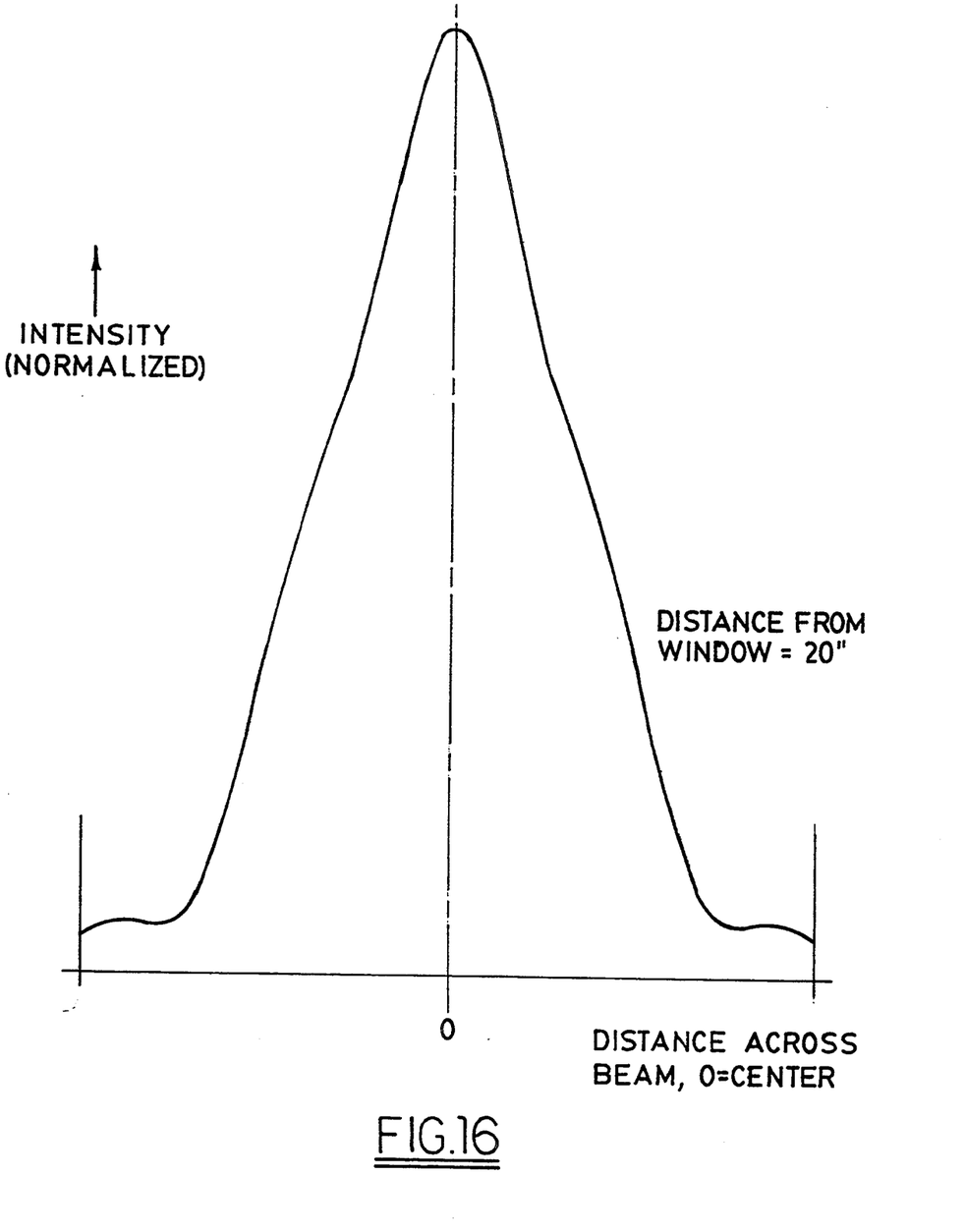
Figure 17:
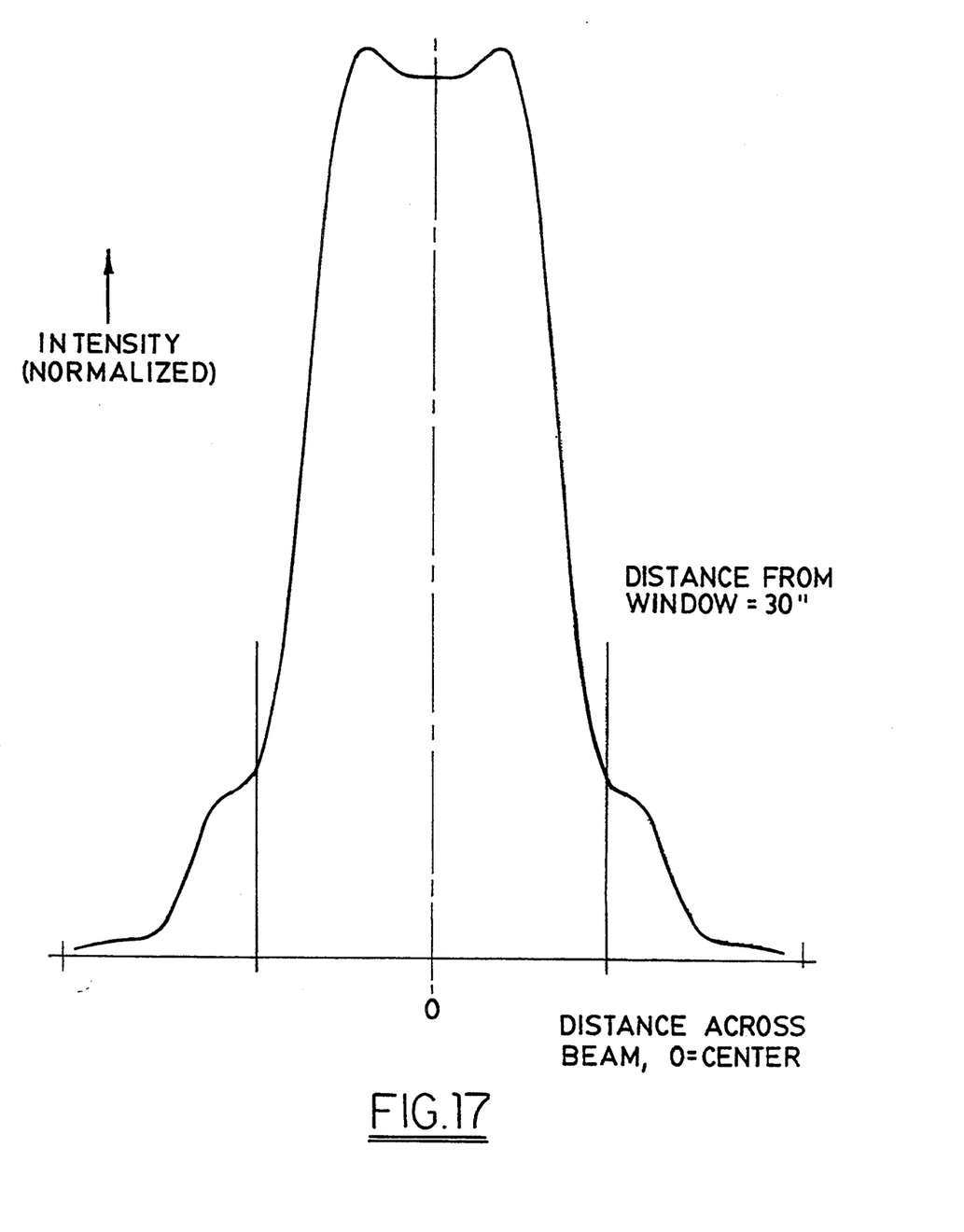

FIG. 11 illustrates a diagram similar to FIG. 10 but where a mask such as shown in FIG. 7 comes into play. It will be apparent that there are two intersections and the distance over which the beam has generally constant size across the resolving axis, w, may be extended through the use of additional segments of the mask.

Consider next how the mask segment sizes may be selected. The following example will be understood with reference to FIG. 10 for the case where the geometric image distance of the lens which focuses light through each segment of the mask is equal to the Fresnel distance $d_F$ of each segment. A compound lens, with different optical power over each mask segment, is assumed in the computation and derivation of the following equations (1) to (11). However, a lens may be used having the same power over its saggital plane, where the focus distance for the system is equal to the Fresnel distance for the largest segment or $d_{FA}$ equals $A^2 \div 4 \lambda$, where $\lambda$ is the wavelength of the light from the laser. This is the condition for the derivation of equations (12)-(33).

In the exemplary case, equation (1) defines the waist side $w_{a1}$ due to near field diffraction of the smaller mask segment $$w_{a1} = a \left[ 1 - \frac{1}{fa} \left[ 1 + \frac{(1-v)}{d_{Fa}} fa \right] d_{wa1} \right] \quad (1)$$

$w_{a2}$ defines the waist size due to far field diffraction $$W_{a2} = a\left[\frac{vd_{wa2}}{d_{Fa}}\right] \quad (2)$$

$w_{A1}$ is the beam waist size due to the larger mask segment of size A for near field diffraction and $w_{A2}$ for far field diffraction as shown in equations in (3) and (4) below.

$$w_{A1} = A\left[1 - \frac{1}{fA}\left[1 + \frac{(1-v)}{d_{FA}}fA\right]d_{wA1}\right] \quad (3)$$

$$w_{A2} = A\left[\frac{vd_{wA2}}{d_{FA}}\right] \quad (4)$$

In these equations v is a constant. Its value matches the theoretically calculated beam width to the experimentally measured beam width. The value of v varies depending upon the modality of measurement (i.e., FWHM or full width half maximum, $1/e^2$ points, where e is the base for Naperian logarithms, etc.).

$$W_{a1} = W_{a2} = W_{A1} = W_{A2} \rightarrow W \quad (5)$$

$$f = d_F = \frac{(\text{aper. dia})^2}{4\lambda} \quad (6)$$

$$d_{Fa} = a^2/4\lambda \quad (7)$$

$$d_{FA} = A^2/4\lambda \quad (8)$$

Equation (5) defines the desired condition shown in FIG. 10 in which the waist size due to far and near field diffraction are equal at the cross over point P.

Equations 6, 7 and 8 define the Fresnel distances and point out that they are equal to the focus distance in the case for which the quasi-near field is at infinity. Equations 1-8 are solved for dwa2 and dwA1, which are equal as shown in Equations 9

$$d_{wa2} = \frac{wa}{4\lambda v} = d_{wA1} = \frac{A^2 - Aw_{A1}}{4\lambda(2-v)} \quad (9)$$

Solving for a and A results in equations 11 and 12

$$a = \frac{Av(A-w)}{w(2-v)} \quad (10)$$

$$A = \frac{w \pm \sqrt{w^2 + 4\frac{(aw(2-v))}{v}}}{2} \quad (11)$$

For the case in which the requirement is to read reduced UPC bar code, 10 mil minimum width bars, at the window 14, a value for a in the equations is selected. This selection is made by examining plots similar to the plot shown in FIG. 10 for the smaller size mask aperture. For example, examination of such plots reveal that (a) is 41 mils. Then $d_{Fa}$ is 15.9 inches. Substituting into equation (11) and using using W of 10 mils, the size of the larger mask, A is 0.071 inches. That size provides a distance dwA2 of thirty-two inches. Therefore, in this example, 10 mil bar code can be resolved over a distance of from seven to 39 inches from the laser assembly 72 (FIG. 3C) or from the window 84 to about two and one half feet from the window 84 the scanner.

For the case where the lens has a single power, then the segment sizes may be selected using the following computation to obtain values for a & A using the plots similar to FIG. 10 as discussed above, whereas in the equations presented above.

$d_F$ = Fresnel Distance,
f = geometric focus distance, and
v = constant relating results to measured data $$w_{a1} = w_{a2} = w_{A1} = w_{A2} \rightarrow w, \quad (12)$$

$$d_{Fa} = \frac{a^2}{4\lambda}, d_{FA} = \frac{A^2}{4\lambda}, \text{ and} \quad (13),(14)$$

$$fa = fA = d_{fA} = \frac{A^2}{4\lambda} \quad (15)$$

$$W_{a1} = a\left[1 - \frac{1}{fa}\left[1 + \left(\frac{1-v}{d_{fa}}\right)fa\right]d_{wa1}\right] \quad (16)$$

substituting:

$$w = a\left[1 - \frac{4\lambda}{A^2}\left[1 + \left(\frac{1-v}{a^2/4\lambda}\right)\frac{A^2}{4\lambda}\right]d_{wa1}\right] \quad (17)$$

$$d_{wa1} = \frac{(a-w)A^2a}{\lambda 4(a^2 + A^2(1-v))}, \text{ and} \quad (18)$$

$$w_{a2} = a\left[\frac{vd_{wa2}}{d_{fa}}\right] \quad (19)$$

$$w = a\left[\frac{vd_{wa2}}{a^2/4\lambda}\right] \quad (20)$$

$$d_{wa2} = \frac{wa}{4\lambda v}, \text{ and} \quad (21)$$

$$w_{A1} = A\left[1 - \frac{1}{fA}\left[1 + \left(\frac{1-v}{d_{FA}}\right)fA\right]d_{WA1}\right] \quad (22)$$

substituting:

$$w = A\left[1 - \frac{4\lambda}{A^2}\left[1 + \left(\frac{1-v}{A^2/4\lambda}\right)\frac{A^2}{4\lambda}\right]d_{WA1}\right] \quad (23)$$

$$d_{wa1} = \frac{A^2 - Aw}{4\lambda(2-v)}, \text{ and} \quad (24)$$

$$w_{A2} = A\left[\frac{v\,d_{WA2}}{d_{FA}}\right] \quad (25)$$

substituting:

$$w = A\left[\frac{v\,d_{wa2}}{A^2/4\lambda}\right], \text{ and} \quad (26)$$

$$d_{WA2} = \frac{wA}{4\lambda v} \quad (27)$$

For optimum depth of focus for a given size bar code, it is desirable to have two or more segment sizes with the ability to focus the light through each aperture to their respective Fresnel Distances.

Examing the case of a 2-segment mask:

With two defined segments and two specific focus the depth of field (DOF) is:

$$DOF = d_{wA2} - d_{wa1} \quad (28)$$

$$\frac{wA}{4\lambda v} - \frac{a^2 - aw}{4\lambda(2-v)} \quad (29)$$

$$DOF = \frac{wA(2-v) - av(a-w)}{4\lambda v(2-v)} \quad (30)$$

Equation 30 may be used to find A after a and w and a desired DOF are selected.

The decrease in depth of field when the single focus for the system is the Fresnel Distance of the larger aperture is equal to the difference between $d_{wa1}(2f)$ and $d_{wa1}(1f)$.

$$\Delta DOF = d_{wa1}(1f) - d_{wa1}(2f) \quad (31)$$

$$\Delta DOF = \frac{(a-w)A^2 a}{4\lambda(a^2 + A^2(1-v))} - \frac{a^2 - aw}{4\lambda(2-v)} \quad (32)$$

$$\Delta DOF = \frac{(a^2 - aw)(a^2 - A^2)}{4\lambda(a^2 + A^2 - A^2 v)(2-v)} \quad (33)$$

From the foregoing description, it will be apparent that there has been provided improved bar code apparatus and optical methods and equipment for beam shaping and control. Variations and modifications in the herein described system will undoubtedly suggest themselves to those skilled in the art. Accordingly, the foregoing description should be taken as illustrative and not in a limiting sense.

We claim:

1. The method of producing a pattern of generally monochromatic light having a predetermined configuration pattern and orientation over a range of distances which comprises projecting a beam of light along a path extending over said range, and forming said light to produce said configuration and orientation in planes perpendicular to said path within said range by far field diffraction of said light by a mask having a plurality of apertures through all of which said beam passes which provides far field diffraction in successive overlapping distances which comprise said range.

2. The method according to claim 1 wherein said projecting step is carried out with a laser, and said forming step is carried out by limiting the intensity of said light transmitted through certain of said plurality of apertures with respect to the light transmitted through at least one other of said plurality of apertures.

3. The method according to claim 2 wherein said limiting step includes the step of forming of said apertures with material having different transmissivity in said at least one other of said apertures from said certain of said plurality of apertures.

4. The method according to claim 3 wherein said forming step is carried out by deposition of light absorbing material on a surface of an optical element.

5. The method according to claim 3 wherein said forming step is carried out by diffusion of optically absorbing material into the material of an optical element.

6. The method according to claim 1 wherein said forming step is carried out by apodizing said light into an area through which said beam passes before entering said range, said area having a plurality of segments which defines said plurality of apertures, such that far field diffraction due to one of said plurality of segments defining a shorter distance across said area overlaps near field diffraction due to another of said segments defining a longer distance across said area, which distances coincide in part.

7. The method according to claim 6 wherein said projecting step is carried out to provide said beam as a generally elliptical beam having its major axis along a line along which said coinciding distances are disposed.

8. The method according to claim 6 further comprising the step of generating said light in diverging beam which diverges from said path at a greater angle with respect to a first line perpendicular to said path than to a second line also perpendicular to said path which is perpendicular to said first line so that the cross-section of said beam is shorter along said first line and longer along said second line, and said apodizing step is carried out with the shorter distance across said area being along said second line.

9. The method according to claim 8 wherein said generating step is carried out with the aide of laser diode.

10. The method according to claim 6 wherein said projection step is carried out with the aide of a lens having a geometric image distance at least equal to the square of said shorter distance divided by the wavelength of said light.

11. The method according to claim 10 wherein said geometric image distance for said lens for light apodized by the segment having the longer distance is at least equal to the square of the longer distance divided by the wavelength of said light.

12. The method according to claim 6 wherein said apodizing step is carried out with said shorter and longer distances across said area selected so that said configuration has a dimension along its cross-section which remains generally the same over at least a substantial portion of said range.

13. The method according to claim 12 further comprising the step of scanning said pattern over a bar code with bars of different width so as to produce return light from which the symbol represented by the code can be recognized, and wherein said apodizing step is carried out to select said larger and shorter distances to provide the width of said pattern in the direction in which said pattern is scanned across the width of said bars of said code.

14. The method according to claim 1 wherein said apertures are concentric with each other.

15. The method according to claim 1 wherein said apertures are radially symmetric about a center which coincides with the center of said beam.

16. The method according to claim 1 wherein said projecting step is carried out with the aid of a lens which collimates said light before said beam reaches said mask.

17. The method according to claim 1 wherein said projecting step further comprises the step of focusing said light with an element having a focus at the part of said range which is provided by far field diffraction at the near end of said part of said range.

18. In a bar code scanner, a system for shaping a laser beam which scans the bars of the code to a cross-section with a resolving dimension in the scanning direction across the width of the bars of the code which is sufficiently small to read the code over a certain working range from a window of the scanner through which said beam projects, which system comprises a diffracting element in the path of said be provided by a mask having a plurality of apertures through all of which the beam passes and which are sized in a direction along said resolving dimension and in predetermined relationship to each other which minimizes said resolving dimension over said depth of field.

19. The system according to claim 18 wherein said aperatures are of a shape which is elongated in one dimension and narrow in a dimension generally perpendicular thereto and are disposed in the vicinity of a lens through which said beam passes, said elongated dimension being oriented generally along the length of the bars of said code, said apertures being longer than said beam along such elongated dimension of said apertures.

20. The system according to claim 18 wherein said apertures are part of optic means having a lens which collimates the beam where it passes through the apertures.

21. The system according to claim 18 wherein said apertures are part of optic means having a lens which provides a focus further from the window than the near end of a region of far field diffraction due to the one of said apertures of smaller size in a direction along said resolving dimension.

22. The system according to claim 18 wherein said apertures are generally concentric with each other to define segments sized along said resolving dimension inside and outside each other.

23. The system according to claim 22 wherein said inside segments are of greater transmissivity than said outside segments.

24. The system according to claim 22 wherein said outside segments having greater transmissivity than said inside segments.

25. The system according to claim 22 wherein said segments are generally rectilinear stripes including a central stripe and stripes outside said central stripe, either said inside or outside stripes being of greater transmissivity than the other.

26. The system according to claim 22 wherein said segments are concentric and generally circular, either the inside ones of said segments being of greater transmissivity than the outside segments or vice versa.

27. The system according to claim 22 wherein the segments are generally rectilinear and are of successively greater transmissivity either in a direction from the inside to the outside or from the outside to the inside.

28. The system according to claim 18 wherein said apertures are sized so that regions of far field diffraction due to the aperture of smaller size in the direction along said resolving dimension overlaps the region of near field diffraction due to the aperture of larger size along said resolving dimension, and said sizes of said apertures are such that said regions cross at a point corresponding to the resolving dimension of said beam which is minimized over said working range.

* * * * *